June 18, 1968     A. S. CAMPBELL     3,388,589

METHOD AND APPARATUS FOR DETERMINING THE CENTER OF GRAVITY

Filed Dec. 17, 1964

Albert S. Campbell,
INVENTOR.

BY *Harry W. Saragovitz*
*Edward J. Kelly*
*Herbert Berl*
*James T. Deaton*
ATTORNEYS United States Patent Office 3,388,589
Patented June 18, 1968

3,388,589
METHOD AND APPARATUS FOR DETERMINING THE CENTER OF GRAVITY
Albert S. Campbell, Las Cruces, N. Mex., assignor to the United States of America as represented by the Secretary of the Army
Filed Dec. 17, 1964, Ser. No. 419,253
14 Claims. (Cl. 73—65)

ABSTRACT OF THE DISCLOSURE

A center of gravity determining device which has a platform that is balanced in a horizontal position with a specimen thereon such that a vertical imaginary line passes through the center of gravity of the specimen and the platform so that marking means can be used to mark the upper and lower surfaces of the sample where the imaginary line passes through the specimen center of gravity.

---

The invention described herein may be manufactured and used by or for the Government for governmental purposes without the payment of any royalty thereon.

The present invention relates to a method and apparatus for determining the center of gravity of a specimen whether of regular or irregular shape.

The location of the center of gravity of specimens of all sizes and shapes has become a vital operation as relates to the missile industry. As missiles are built in rapidly increasing numbers, the problem of locating the center of gravity of each apparatus within a missile has become one of speed as well as accuracy. At present the method of determining the center of gravity of a missile assembly, its sub-assemblies and components, consists of a method of weighing, measuring and calculating the leverage. The various processes required for performing these several steps present several opportunities for error from the manner in which the weighing is performed, i.e., the manner in which the specimen is placed on the scales, or they may stem from human errors in making the calculations. The present method is also time consuming especially when cross checks are made to assure correctness of the results.

The method and apparatus for determining the center of gravity herein presented, eliminates calculations, weighing, and the criticality in the original position in which the specimen is placed on a special device. As a result, the center of gravity can be determined quickly and accurately without the need of a skilled operator. The inventor's method is based on the fact that when a balance pendulum comes to rest, the center of gravity of the pendulum is aligned exactly with the imaginary axis of gravity of the earth. Thus, if one incorporates a specimen into a pendulum type device, the center of gravity of the pendulum will be aligned with the center of gravity of the earth only when the specimen is positioned on the pendulum so as to align its center of gravity with that of the pendulum. Thus, one need only mark the upper and lower surfaces of the specimen at the point of the center of gravity of the combined pendulum and specimen. A line between these two points will necessarily pass through the center of gravity of the specimen. Thus, repetition of this process upon various surfaces of the specimen will result in a plurality of lines which pass through the center of gravity of the specimen.

Accordingly, it is an object of this invention to provide a method of determining the center of gravity of a specimen with speed and accuracy.

Another object of this invention is to provide a device for locating the center of gravity of a specimen.

Still another object of this invention is to provide a device for locating the center of gravity of a specimen, the cost of which is relatively small.

Yet another object of this invention is to provide a device for locating the center of gravity of a specimen, the operation of which is quite simple and dependable.

Yet another object of this invention is to provide a device for determining the center of gravity of a specimen which requires a minimum of steps for such determination.

This invention together with other objects and advantages hereof may be better understood by reference to the following description and accompanying drawings in which.

Figures 1, 2:
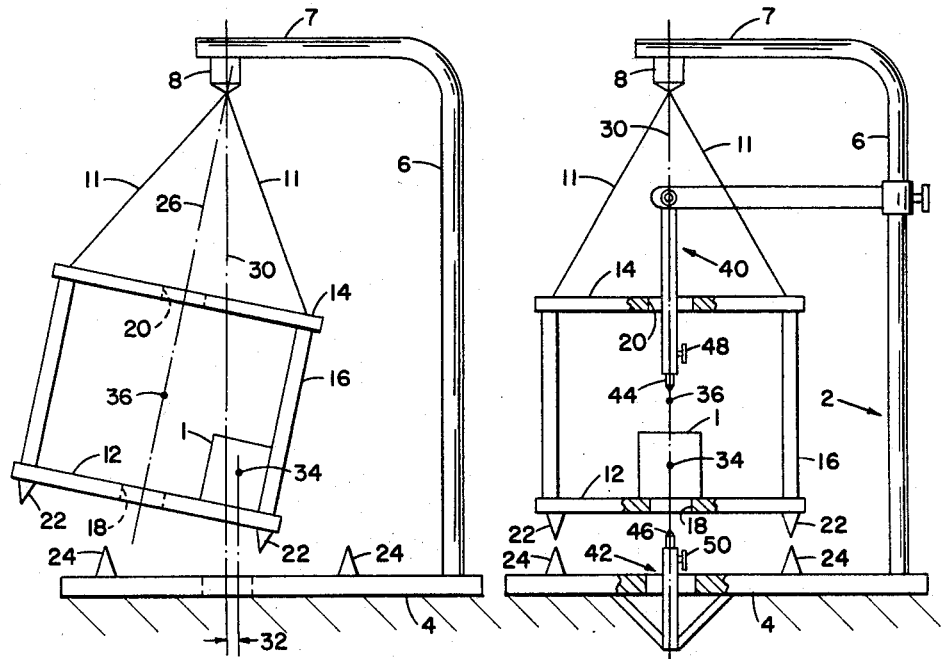
FIGURE 1 is an elevational view of one form of this invention in which a specimen and specimen cage are illustrated in balance position.
FIGURE 2 is an elevational view similar to that of FIGURE 1, but showing the specimen and cage in out of balance position.

Referring now to FIGURE 1, the apparatus for determining the center of gravity of specimen 1 includes a support frame 2 having a base 4 and a support column 6. Upper cantilever portion 7 of support column 6 is provided with a minimum friction universal joint 8 which supports specimen cage 10 by hanger lines 11. Specimen cage 10 includes platform 12 which is attached to upper frame 14 by side braces 16. Platform 12 and upper frame 14 are provided with apertures, 18 and 20 respectively which are immediately above and below the center of gravity 36 of the cage. A plurality of pointers 22 are attached to the underside of platform 12 and serve as alignment indicators in conjunction with pointers 24 located on the upper surface of base 4. Specimen cage 10 is so balanced that when in a still position, specimen cage 10 will be balanced in a horizontal plane, said pointers 22 and 24 will be in perfect alignment and imaginary axis line 30 which passes along the axis of universal joint 8 will pass through the center of gravity 36 of specimen cage 10.

Markers 40 and 42 are accurately mounted on support column 6 and base 4 respectively and in alignment with imaginary axis line 30. Marker 40 has a conventional marking element 44 that is adjustable by control knob 48 to mark the upper surface of the specimen. Marker 42 likewise has a conventional marking element 46 that is adjusted by control knob 50 to mark the lower surface of the specimen.

In operation, a specimen such as specimen 1 is placed on platform 12 of specimen cage 10 and so adjusted thereon until the specimen and specimen cage are balanced in a rest position in said horizontal plane where imaginary axis line 30 passes through the center of gravity 36 of specimen cage 10. In this horizontal plane balanced position, imaginary axis line 30 will also pass through the center of gravity 34 of the specimen. Marker elements 44 and 46 are then used to mark the upper and lower surfaces of the specimen where imaginary axis line 30 passes therethrough. Specimen 1 is next turned and adjusted on platform 12 of cage 10 to determine another imaginary axis through the specimen which passes through the center of gravity of the specimen. When several of these imaginary axes lines through the specimen have been determined and marked as illustrated in FIGURE 3, all these axes can be used to determine the center of gravity 34 of the specimen which is at a common point of intersection of the imaginary axes.

If the specimen is improperly centered on platform 12 of the specimen cage as illustrated in FIGURE 2, the forces acting on the composite device will be out of balance in the horizontal plane. This results due to the fact that the center of gravity 34 of the specimen and 36 of the specimen cage will come to rest aside of imaginary axis line 30 with a difference 32 occuring as an error in the determination of the center of gravity of the specimen. Such an error is determined from the displaced center line 26 of the specimen cage and misalignment of pointers 22 and 24. Proper placement of the specimen on the base, such that pointers 22 and 24 are properly aligned, is essential.

Figures 3, 4:
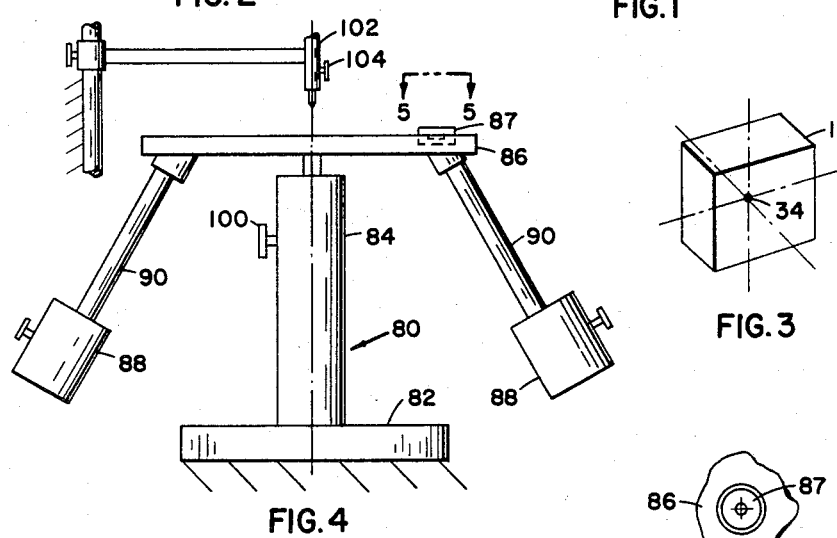
FIGURE 3 is a perspecive view of a specimen.
FIGURE 4 is an elevational view of a modified balancing apparatus.

Referring now to FIGURE 4, a modified balancing apparatus is illustrated wherein a support frame 80 comprises a base 82 which supports upright column 84 and upon which a specimen disc platform 86 is universally mounted. A plurality of weights 88 are adjustably mounted on rods 90 that are secured to disc platform 86 in a conventional manner. These weights may be adjusted radially inwardly or outwardly as desired to vary the stabilizing effect upon the specimen platform. Specimen platform 86 is also provided with one or more spirit level gages 87, of the type illustrated in FIGURE 5, for indicating when the platform is in a horizontal level and balanced position.

Figures 5, 6:
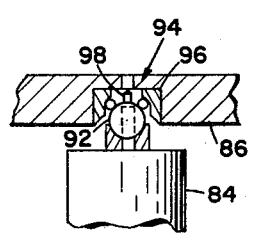
FIGURE 5 is a cut-away view taken on line 5—5 of FIGURE 4.
FIGURE 6 is an elevational sectional view illustrating the details of the universal connection between the support frame and the platform of the balancing apparatus of FIGURE 4.

A variety of universal mounting connectors may be provided between column 84 and specimen disc platform 86, but a preferred universal mounting is illustrated in FIGURE 6 and includes a ball bearing 92 that is mounted in a recess at one end of column 84 and a conventional ball bearing assembly 94 that is mounted in recess 96 of specimen disc platform 86.

The balancing apparatus of FIGURES 4 and 6 also includes marking means such as marking device 98 in FIGURE 6 that is adjustable by knob 100 (see FIGURE 4) to mark the lower surface of a specimen and marking device 102 in FIGURE 4 that is adjustable by knob 104. Marking device 102 may be separately attached over the vertical center line of the device and perpendicular to platform 86 when in the horizontal balanced position as illustrated in FIGURE 4, or marking device 102 may be attached directly to upright column 84 by a U-shaped clamp (not illustrated). Marking devices 98 and 102 are mounted along a common axis to mark a specimen in the same manner as that described for FIGURE 1 supra.

The operation of the balancing apparatus illustrated in FIGURES 4 and 6 is the same as that of FIGURE 1 in that a specimen is placed on platform 86, adjusted to a horizontal balanced position, marked by markers 98 and 102 and turned to make ready for another marking cycle.

While the foregoing is a description of the preferred method and apparatus for determining the center of gravity of a specimen, the following claims are intended to include those modifications and variations that are within the spirit and scope of the invention.

I claim:

1. A center of gravity locating device comprising a specimen platform, having a planar upper surface adapted to receive a specimen thereon, a support frame, means universally attaching said specimen platform to said support frame, said specimen platform being so balanced as to come to rest in a horizontal position in which an imaginary vertical line passes through the center of gravity of said platform and a point of universal attachment between said support frame and said platform, means for indicating the horizontal position of said specimen platform, whereby the specimen may be placed on said platform and moved on said planar upper surface until the specimen and platform come to rest in said horizontal position where said imaginary vertical line will pass through the center of gravity of the specimen and said platform.

2. A device as set forth in claim 1 wherein said platform has a marking aperture at the center thereof and wherein means are provided for marking the upper and lower surface of a specimen on said platform, said marking means being mounted in alignment with said vertical line passing through the point of universal attachment between said platform and said support frame.

3. A device as set forth in claim 2 wherein said support frame comprises a base and an upright column, said upright column being located immediately beneath said specimen platform, said universal means between said platform and frame being a ball joint connection, and a plurality of radially extending weights attached to the platform for stabilization thereof.

4. A device as set forth in claim 3 wherein said ball joint comprises a large ball mounted in said upright column, a plurality of small balls located in the under side of said specimen platform and rotatably engaging said large ball.

5. A device as set forth in claim 4 wherein said horizontal indicating means includes at least one spirit level gage mounted on said specimen platform.

6. A device as set forth in claim 2 wherein said specimen platform is a portion of a cage, and said universal means attaches said cage to a cantilever portion of said support frame.

7. A center of gravity locating device comprising: a cage having a specimen platform as a portion thereof; a support frame; means universally attaching said cage to a cantilever portion of said support frame; said specimen platform and cage being so balanced as to come to rest in a horizontal position; means for indicating the horizontal position of said specimen platform; means for marking the upper and lower surfaces of a specimen on said platform, said marking means being in alignment with a vertical line passing through the point of universal attachment between said platform and said cage; and apertures in said specimen platform, said frame and said cage to accommodate said marking means, whereby the specimen may be placed on said platform and moved on said platform until the specimen and platform come to rest in said horizontal position.

8. A device as set forth in claim 7 wherein said marking means includes a pair of marking elements passing through the apertured portions of said cage, platform and frame, whereby said specimen may be marked on its upper and lower surfaces where an imaginary line passes through the center of gravity of the specimen.

9. A device as set forth in claim 8 wherein said horizontal indicating means comprise a series of pointers attached to the under surface of said specimen platform and an upper surface of said support frame respectively, whereby alignment of said pointers indicates the horizontal position of the combination of the cage and specimen.

10. A method for determining the center of gravity of a specimen comprising: placing a specimen on balancing apparatus in which a vertical imaginary line passes through the center of gravity of said balancing apparatus when the balancing apparatus is in a balanced horizontal position, positioning said specimen on said balancing apparatus until said imaginary vertical line passes through both the center of gravity of said specimen and said balancing apparatus, and marking the upper and lower surfaces of said specimen where said imaginary vertical line passes through said specimen.

11. A method as set forth in claim 10 and further including, turning said specimen and finding at least one additional imaginary line that passes through the center of gravity of said specimen.

12. A method for determining the center of gravity of a specimen comprising, providing a specimen, finding a plurality of imaginary lines that pass through the center of gravity of said specimen by first positioning said specimen on balancing apparatus in which an imaginary vertical line passes through both the center of gravity of said specimen and said balancing apparatus when said specimen is in balance on said balancing apparatus and then turning and repositioning said specimen on said balancing apparatus until said imaginary vertical line again passes through the center of gravity of said specimen and said balancing apparatus, and determining the center of gravity of said specimen to be at a common intersection point of said imaginary lines.

13. A method for determining the center of gravity of a specimen as set forth in claim 12, and further including marking said specimen on the outer surfaces where said imaginary lines pass through said specimen.

14. A center of gravity locating device comprising: a specimen platform having a marking aperture at the center thereof, a planar upper surface adapted to receive a specimen thereon, at least one spirit level gage mounted thereon for indicating the horizontal position of the specimen platform, and a plurality of radially extending weights attached to the platform and adjustable toward and away from a vertical axis which passes through said platform when in a balanced position for stabilization of the platform; a support frame including a base and an upright column, said upright column being located immediately beneath said specimen platform; means universally attaching said specimen platform to said support frame including a ball joint connection with a large ball mounted in said upright column and a plurality of small balls located in the under side of said platform and in rotatable engagement with said large ball, said specimen platform being so balanced on said support frame as to come to rest in a horizontal position in which an imaginary vertical line passes through the center of gravity of said platform and a point of universal attachment between said support frame and said platform; and means for marking the upper and lower surfaces of a specimen on said platform, said marking means being in alignment with said vertical axis and said vertical axis also passing through the point of universal attachment between said platform and said support frame whereby the specimen may be placed on said platform and moved on said planar upper surface until the specimen and platform come to rest in said horizontal position.

References Cited

UNITED STATES PATENTS

| | | | |
|---|---|---|---|
| 3,320,794 | 5/1967 | Monroe et al. | 73—65 |
| 3,320,795 | 5/1967 | Monroe et al. | 73—65 |
| 2,782,631 | 2/1957 | Baltrukonis et al. | 73—65 |
| 2,995,924 | 8/1961 | Karpovich | 73—65 |
| 3,036,468 | 5/1962 | Anderson | 73—486 |
| 3,148,546 | 9/1964 | Karig | 73—486 |
| 3,164,996 | 1/1965 | Carrigan | 73—483 |
| 3,225,590 | 12/1965 | Ward et al. | 73—65 |

JAMES J. GILL, *Primary Examiner.*

RICHARD C. QUEISSER, *Examiner.*

R. S. SALZMAN, *Assistant Examiner.*